US012801396B2

(12) United States Patent
Covolato et al.

(10) Patent No.: US 12,801,396 B2
(45) Date of Patent: Nov. 17, 2026

(54) MEASURED BOOT IMPLEMENTATION FOR NETWORK DEVICES

(71) Applicant: Arista Networks, Inc., Santa Clara, CA (US)

(72) Inventors: Baptiste Elie Franck Covolato, Vancouver (CA); Julien André Alexis Gomes, Vancouver (CA); Ethan Barnett Rahn, Agoura Hills, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 75 days.

(21) Appl. No.: 18/544,999

(22) Filed: Dec. 19, 2023

(65) Prior Publication Data

US 2025/0110748 A1 Apr. 3, 2025

Related U.S. Application Data

(60) Provisional application No. 63/587,250, filed on Oct. 2, 2023.

(51) Int. Cl.
*G06F 9/4401* (2018.01)

(52) U.S. Cl.
CPC .................................. *G06F 9/4401* (2013.01)

(58) Field of Classification Search
None
See application file for complete search history.

(56) References Cited

U.S. PATENT DOCUMENTS

| | | | | |
|---|---|---|---|---|
| 2009/0150899 | A1* | 6/2009 | Tahan | G06F 21/57 718/106 |
| 2010/0125731 | A1* | 5/2010 | Dasari | G06F 21/57 713/155 |
| 2017/0010875 | A1* | 1/2017 | Martinez | G06F 21/60 |
| 2017/0075699 | A1* | 3/2017 | Narayanan | H04L 9/14 |
| 2020/0301764 | A1* | 9/2020 | Thoresen | G06F 9/45541 |
| 2021/0073003 | A1* | 3/2021 | Jacquin | G06F 21/44 |
| 2022/0342657 | A1* | 10/2022 | Amundsen | G06F 9/4401 |

OTHER PUBLICATIONS

"TCG PC Client Platform Firmware Profile Specification," Trusted Computing Group, Dec. 4, 2019, retrieved from << https://trustedcomputinggroup.org/wp-content/uploads/TCG_PCClient_PFP_r1p05_05_3feb20.pdf>>, 135 pages.

* cited by examiner

*Primary Examiner* — Paul Yen
(74) *Attorney, Agent, or Firm* — Sprinkle IP Law Group

(57) ABSTRACT

Systems and methods for providing interfaces for measured boot data on network devices are disclosed. Embodiment of such a measured boot interface on a network device may include both a command line interface (CLI) or an Application Programming Interface (API) provided through the operating system of the network device. Measured boot data returned in response to a request received via the CLI (e.g., through a command) may be returned in an easily digested human readable format. Similarly, measured boot data returned in response to accesses to the API may be returned in a machine readable format such that verification of the measured boot data can be programmatically accomplished.

20 Claims, 5 Drawing Sheets

MEASURED BOOT IMPLEMENTATION FOR NETWORK DEVICES

RELATED APPLICATIONS

This patent application claims the benefit of priority under 35 U.S.C. 119 to U.S. Provisional Patent Application Ser. No. 63/587,250 filed Oct. 2, 2023, entitled "MEASURED BOOT IMPLEMENTATION FOR NETWORK DEVICES" by inventors Covolato et al, which is incorporated herein in its entirety by reference for all purposes.

BACKGROUND

A Trusted Platform Module (TPM) is used to improve the security of network devices. Specifically, a TPM is one or more computer chips that can securely store artifacts used to authenticate a computer device. A TPM can thus be used to implement a variety of security measures with respect to network devices in which it is included. In some of these security measures, the TPM can be used to verify, by attestation, that correct software was loaded on the network device.

To conduct such a verification, a challenge can be issued to the TPM to obtain a TPM quote. A TPM quote is a reading of storage locations of the TPM that are signed by a private key belonging to that particular TPM. A TPM quote is thus the way in which a user can retrieve information about the status of the system and the current values held in the TPM. The process of interacting with a TPM to obtain and utilize a quote is, however, not a straightforward process. This complicates both the use of a TPM and the security features relying on that that TPM.

What is desired, therefore, are simplified interactions with TPMs on network devices.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 3A, 3B and 3C are hybrid diagrams depicting embodiment of the implementation of measured boot commands.

DETAILED DESCRIPTION

Figure 1:
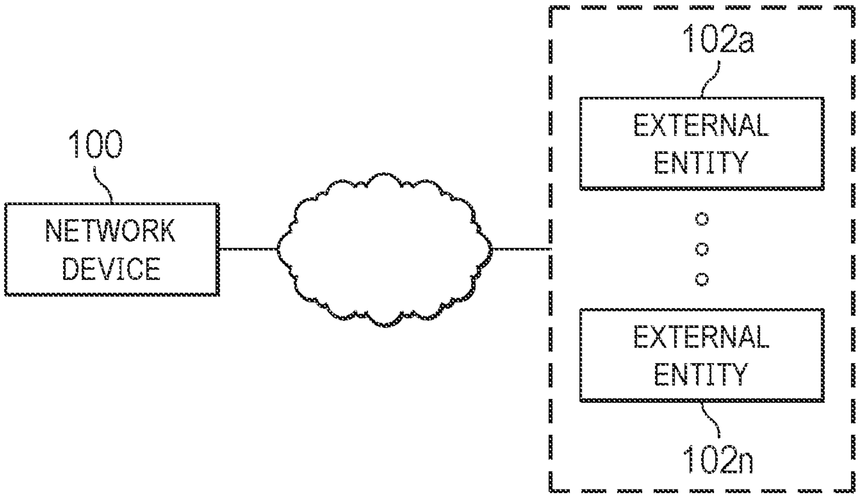
FIG. 1 is a block diagram of a network system including an embodiment of a network device providing a measured boot interface.

As discussed, a TPM is one or more (e.g., physical or virtual) computer chips (e.g., a microcontroller) that can securely store artifacts used to authenticate a network device. A TPM is thus used to improve the security of network devices. In particular, a TPM contains a set of Platform Configuration Registers (PCRs) that are memory locations in the TPM chip with special properties allowing for the recording of measurements and which are resistant to tampering. Fundamentally, a PCR register (despite the seeming redundancy a PCR is sometimes also referred to as a PCR register) stores one hash (value). For TPM1.2 platforms, this checksum is a sha1. On TPM2.0 platforms, this hash is a sha256 (other hashing algorithms checksums may also be utilized). These hashes are cryptographically signed using a private key of an Attestation Identity Key (AIK) pair provisioned for that TPM. The public portion of the AIK pair may be embedded in a certificate (e.g., that may be stored at the network device and elsewhere) while the private key of the AIK pair may be embedded in the TPM.

The TPM specification currently mandates that chips provide a certain number of registers, some of which cannot be reset (e.g., except by a power cycle). Currently, for example, the current TPM specification indicates that TPM chips should provide at least 24 PCR registers, 16 of which cannot be reset. Additionally, PCR registers cannot be directly set to a certain value. They can only be "extended". That is, the current value contained in a PCR register can be concatenated with the value it is desired to extend the register with. This concatenated value is then hashed with the hashing algorithm utilized in the implemented TPM platform, and the result is stored as the new value in that PCR register. The tampering resistant property of PCR registers is derived both from the use of secure hash algorithms to extend the internal value, as well as the non-resettable properties of at least some of PCR registers (e.g., a power cycle is necessary to reset these registers).

Secure boot represents an industry-wide standard for security of devices in the (pre) boot environment using a TPM. Secure boot is the process of verification that the image to be booted, as well as components loaded prior to that image, are exactly as expected. Secure boot may be used during hardware root of trust, firmware load, and firmware upgrade. Secure boot also extends through all the various images that need to be booted all the way, through the execution of the operating system image, such as bootloaders, to firmware to Initial BIOS.

To implement such a secure boot, a measured boot process may be implemented. A measured boot is the process of storing hash values used for authentication during a boot sequence. Specifically, measured boot is a security feature where components playing a role during the boot process get measured and recorded into the (e.g., non-resettable) PCR registers of the TPM. As a power cycle is necessary to reset these PCR registers, a boot sequence would repopulate the values before an attacker has the opportunity to tamper with the registers. It will be noted that secure boot and measured boot may be thought of as distinct security measures, measured boot can be used without secure boot and the contrary is true as well, secure boot can be utilized without measured boot.

In the context of a boot of a network device, then, the PCR registers utilized in a measured boot can be inspected once the network device is fully booted to ensure everything matches the expected state (e.g., the values in the PCR registers are what are expected given the software that should have been loaded during boot of the network device). Thus, the TPM can serve as an embedded cryptographic processor that can be used to verify, by attestation, that the correct software was booted on the network device with cryptographic proof of software measurements signed by the private key of the AIK pair associated with that TPM. A user who knows the corresponding public key of the AIK pair for that TPM can verify the attestation measurements recorded by the TPM. The TPM thus acts as a witness, where the attestation by the TPM is cryptographic proof that the signed value is the current value.

To conduct such a verification, a challenge can be issued to the TPM to obtain a TPM quote (or just "quote"). A quote is a reading of the TPM's PCR registers' values signed by the private AIK belonging to that particular TPM. A quote is thus the way in which a user can retrieve trustable information about the status of the system and the current values of the PCR registers held in the TPM. A quote usually contains two parts: "info" and "data." The info part is a binary structure that represents the current state of the PCR registers and other relevant information, while the data part is a cryptographic signature generated by the TPM using the AIK. These PCR values of the quote can then be utilized to verify the network device booted the correct software.

The process of interacting with a TPM to obtain and utilize a quote is, however, not a straightforward process. It is typically the case that a user has to be familiar enough with the TPM specification (e.g., ISO/IEC 11889) to write code to interact with the TPM. Additionally, the user may be required to have access to a shell (e.g., a Bourne Again Shell (bash shell)) on the network device that includes the TPM (e.g., to write or execute the code in a particular environment, or with a particular level of access). These requirements severely curtail the usefulness of measured boot implementations in network devices. In particular, the knowledge hurdles and shell access requirements may conspire to constrain the types of users that may verify network devices using measured boot and, more generally, increase friction in the implementation or use of measured boot on network devices. As an additional limitation, to make use of a TPM quote a user must independently obtain, and apply, the public key associated with the AIK of the TPM. This information may not be readily accessible. Moreover, these requirements, along with the format or typical delivery of quotes from a TPM may also serve to limit the use of automated mechanisms for accessing and evaluating such measured boot data.

What is desired, therefore, are simple interfaces for (direct or indirect) interaction with TPMs on network devices and, in particular, more simple and streamlined interfaces for network devices that are adapted for obtaining TPM data in both a manual and automated manner.

To address those desires, among others, attention is directed to embodiments as disclosed which provide network devices, and associated methods, implementing such interfaces for providing measured boot data (e.g., TPM data). These interfaces may include both a command line interface (CLI) or an Application Programming Interface (API) provided through the operating system of the network device. Measured boot data (e.g., TPM data) returned in response to a request received via the CLI (e.g., through a command) may be returned in an easily digested human readable format. Similarly, measured boot data (e.g., TPM data) returned in response to accesses to the API (e.g., requests received through the API) may be returned in a machine readable format (e.g., a serialized or non-serialized format) such that verification of the (e.g., TPM) data can be programmatically accomplished without involvement of a user based on the data returned in response to access through that API.

According to certain embodiments, therefore, TPM commands associated with measured boot may be provided through an interface, such as CLI provided by an operating system of a network device. One of the commands provided may be a measured boot status command where the status of measured boot on the network device may be obtained. Such a command may also return an enablement status (e.g., enabled or disabled) of measured boot on the network device.

In one embodiment, the status of measured boot on the device may be maintained in a configuration store residing in the TPM. This configuration store may be readable from the operating system and can maintain the enablement status of measured boot on the device. Specifically, the TPM may have non-volatile memory that may be reserved. Embodiments may thus store a configuration of the measured boot in such a reserved section of memory in the TPM (e.g., as a flag or status bit in a set of configuration bits in the memory of the TPM). This reserved section of memory in the TPM may be writable only from a bootloader of the network device but may be readable at any time from the operating system. In this manner, the enablement status of the measured boot for the network device may only be changed by someone with access to the bootloader, but may be obtained from the operating system and provided in response to a measured boot status command issued to the operating system (e.g., through the CLI or API provided by the operating system).

Embodiments may also provide a command to obtain TPM data from the TPM of the network device (referred to herein without loss of generality as a tpm pcr command). Such a tpm pcr command may allow the specification of a nonce to be utilized in obtaining TPM data (which may be an optional parameter) along with a specification of individual or ranges of (or both) PCR registers. This tpm pcr command can then be received at the operating system of the network device. The network device (e.g., the operating system of the network device) can then obtain a quote from the TPM for the specified PCR registers using the nonce specified in the command when one is provided (otherwise zero may be utilized as a nonce value when obtaining a TPM quote). Using the TPM quote obtained, a response to the tpm pcr command may be formulated. Specifically, the values of the PCR registers specified in the tpm pcr command may be determined from the quote data returned by the TPM. The response to the tpm pcr command may thus include a version of TPM being utilized by the network device, along with the value for each of the PCR registers specified in the tpm pcr command individually delineated and identified in association with the corresponding PCR in a human readable format. The response to the tpm pcr command may also include AIK certificate data, including the AIK public key corresponding to the AIK private key associated with the TPM of the network device.

It will be noted that because of the way PCR registers operate it can be difficult to debug measured boot state with just the PCR values post boot. Indeed, if the final value of a PCR register doesn't match the expected state, a user may determine the network device state differs from what they expect. However, this determination does not indicate what is amiss. To help with debugging, the network device (e.g., the bootloader and operating system) may log (e.g., store or otherwise record) every time a PCR register is extended with a new measurement. This record contains a timestamp, PCR register index, event type, checksum the PCR register was extended with, and some metadata to help with debugging. Accordingly, in some embodiments a command may be provided to allow a user to obtain this PCR log. In this manner, the data required to determine where the user can recompute the expected PCR value for each index based on the returned logs and compare the obtained values with the actual PCR value extracted from the TPM (e.g., as returned from a tpm pcr command).

As can be seen then, embodiments of interfaces as disclosed may provide a simple and straightforward way to obtain TPM data, including the value of specific PCR registers, associated data returned from the TPM, and an associated public key of the AIK pair associated with the TPM. Consequently, such interfaces may be easily utilized by users of network devices that are less (or not at all) familiar with the TPM specification to verify the state of a network device.

Looking now at FIG. 1, a computing system including one embodiment of a network device providing interfaces for obtaining measured boot data is depicted. The system includes a network device 100 connected to one or more external entities (e.g., 102A, 102N). The network device 100 and the external entities 102 may be directly or indirectly connected to each other using any combination of wired or wireless connections and may communicate using one or more wireless or wired protocols. In embodiments there may be other network devices (or systems) (not shown) that facilitate communication between the devices.

Network device 100 may include persistent storage, memory (e.g., Random Access Memory), one or more processors, a TPM, and network interfaces (ports). The network device 100 may thus be adapted to implement a measured boot process, such that a bootloader, operating system or other components on network device 100 may record values associated with components loaded on the network device 100 during a boot of the network device 100 into the registers of the TPM.

Each port of the network device 100 may or may not be connected to another device on a network (e.g., a server, a switch, a router, etc.). The network device 100 may thus be adapted to receive packets via its ports and process the packet to determine whether to drop or route the packet, and to which port the packet should be routed. How the network device 100 makes the determination of whether to drop the packet, or send the packet to another device on the network may depend, in part, on whether the network element is a layer-2 (L2) switch or a layer-3 (L3) switch (also referred to as a multilayer switch), which may perform at least some functions of a router.

External entity 102 may be, or may execute on, any type of computing system that is configured to interact with the network device 100. For example, the external device 102 may be a desktop computer operated by a network administrator or other type of user. Users at these external network devices 102 (or software application running on such network device 102) may desire to access data related to a measured boot process on network device 100 or to configure or otherwise manage network device 100 (for ease of description herein the term access network device data, configure or manage will all be utilized interchangeably when used with reference to a network device). As such, network device 100 may provide an interface for accessing measured boot data, including data on a status of measured boot on the device, TPM data, PCR log data, or other types of measured boot data. These interfaces may include both a CLI or an API provided through the operating system of the network device 100. These interfaces may thus accept requests (e.g., commands through the CLI or requests received through the API). It should be noted here that while embodiments herein may be described with respect to requests comprising commands received through a CLI other types of requests and interfaces (e.g., a requests received through an API, requests received through a RESTful interface, etc.) may be utilized in other embodiments and are fully contemplated herein.

To access measured boot data of network device 100 then, a user at the external entity 102 (e.g., an application used by such a user) may send requests for this measured boot data to network device 100. Specifically, according to certain embodiments these requests may take the form of commands issued through a CLI. As such, the network device 100 may accept these requests, determine the requested measured boot data and return responses to these commands through the CLI. The measured boot data (e.g., TPM data) returned by the network device 100 in response to a request received via the CLI (e.g., through a command) may be returned in an easily digested human readable format. Similarly, a request for this measured boot data may be sent by the external entity 102 (e.g., an application used by such a user) to network device 100 through an API offered by network device 100. Measured boot data (e.g., TPM data) returned by network device 100 in response to requests received through this API may be returned through that API in a machine readable format (e.g., a serialized or non-serialized format) such that use of this measured boot data (e.g., verification of TPM data) can be programmatically accomplished by software at external entity 102 (or elsewhere) without involvement of a (human) user.

Figure 2:
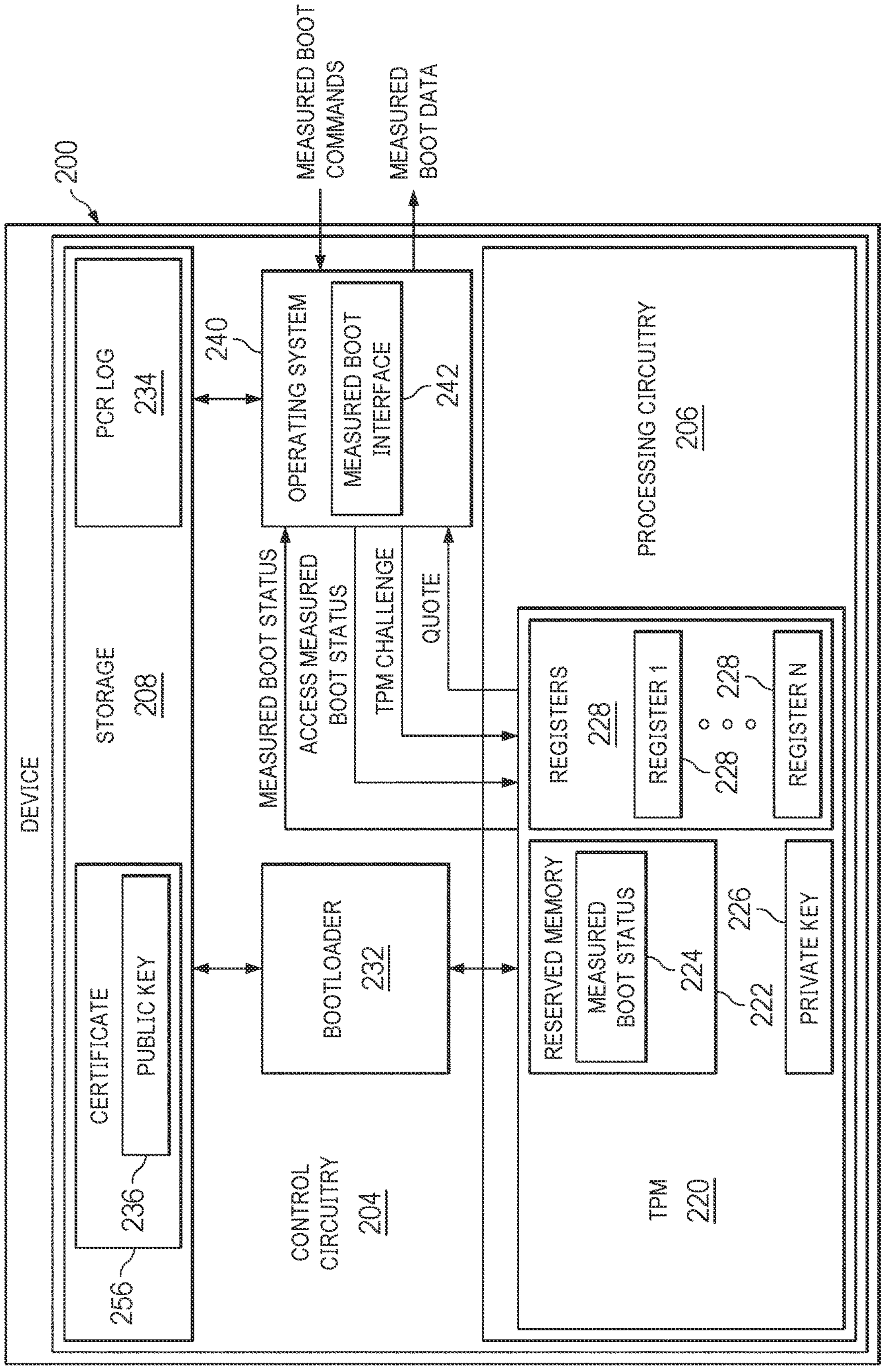

Moving to FIG. 2, a block diagram depicting an architecture of a network device providing measured boot interfaces in accordance with certain embodiments is presented. Network device 200 may be a router, switch, server, or any other computing device that may be configured to control or process network traffic. The network device 200 may receive data, including packets from hosts (not shown) or other sources, via an input/output (I/O) path. The I/O path may provide packet data to control circuitry 204, which includes processing circuitry 206 and storage (i.e., memory) 208. Control circuitry 204 may send and receive commands, requests, and other suitable data using the I/O path. The I/O path may connect control circuitry 204 (and specifically processing circuitry 206) to one or more network interfaces to which other devices of a network (e.g., hosts) can be connected. These network interfaces may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Specifically, processing circuitry 206 can include TPM 220 to improve the security of network device 200. TPM 220 may be one or more (e.g., physical or virtual) computer chips (e.g., a microcontroller) that can securely store artifacts used to authenticate a computer device. TPM 220 contains a set of Platform Configuration Registers (PCRs) 228 associated with an identifier or index identifying that PCR register 228. These PCR registers 228 are memory locations in the TPM 220 with special properties allowing for the storing of a hash value and which are resistant to tampering. These hashes are cryptographically signed using a private key of an Attestation Identity Key (AIK) pair provisioned for that particular TPM 220. The public portion of the AIK pair 236 may be embedded in certificate 256 (e.g., that may be stored in storage 208 at network device 200) while private key 226 of the AIK pair may be embedded in TPM 220.

Storage 208 may be an electronic storage device that includes volatile random-access memory (RAM), which does not retain its contents when power is turned off, and non-volatile RAM, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

Network device 200 can thus be adapted to implement measured boot. According to various embodiments, control circuitry 204 may execute instructions for bootloader 232 and operating system 240. Bootloader 232 may be adapted to implement a measured boot process, including the loading operating system 240, by storing hash values used for authentication in TPM 220 during a boot sequence of network device 200. In one embodiment, whether such a measured boot is actually implemented may be controlled by measured boot status 224 maintained at network device 200. Bootloader 232 may thus offer a command to allow the measured boot status on network device 200 to be set (e.g., enabled or disabled). Accordingly, if measured boot status 224 indicates that measured boot is enabled, bootloader 232 may implement measured boot during a boot of network device 200, while if measured boot status 224 indicates that measured boot is disabled bootloader 232 may not implement measured boot during a boot of network device 200. To help with debugging (or for other reasons), in some embodiments network device 200 (e.g., bootloader 232 or operating system 240) may log (e.g., store or otherwise record) every time a PCR register 228 of TPM 220 is extended with a new measurement. This log may be maintained in PCR log 234, where each record in PCR log 234 may include, for example, a timestamp, a PCR register index, an event type, a checksum the PCR register 228 was extended with, and any additional desired metadata (e.g., to assist with debugging).

In one embodiment, the status 224 of measured boot on the device may be maintained in a configuration store residing in TPM 220. This configuration store may be readable from the operating system 240 and can maintain the enablement status of measured boot on network device 200. Specifically, TPM 220 may have non-volatile memory 222 that may be reserved. Embodiments may thus store a configuration of the measured boot in such a reserved section 222 of memory in TPM 220 (e.g., as a flag or status bit in a set of configuration bits in the memory of TPM 220). This reserved section 222 of memory in the TPM 220 may be writable only from bootloader 232 of network device 200 but may be readable at any time from operating system 240. In this manner, enablement status 224 of measured boot for network device 200 may only be changed by someone with access to bootloader 232.

Operating system 240 provides measured boot interface 242 adapted to provide a simple and streamlined interface for obtaining measured boot data from network device 200 in a manual or automated manner. This interface 242 may include both a CLI or an API. The interface 242 may be adapted such that measured boot data (e.g., TPM data) returned in response to a measured boot requests received via a CLI (e.g., through a measured boot command) may be returned through interface 242 in an easily digested human readable format. Similarly, measured boot data returned in response to accesses to an API of interface 242 (e.g., in response to requests received through the API) may be returned in a machine readable format.

According to certain embodiments, therefore, TPM commands associated with measured boot may be provided through measured boot interface 242. One of the commands provided may be a measured boot status command where the status of measured boot on the network device may be obtained. Such a command may return an enablement status (e.g., enabled or disabled) of measured boot on network device 200. Specifically, a measured boot status command requesting an enablement status may be received at measured boot interface 242. In response to receiving such a measured boot command, measured boot interface 242 may access measured boot status 224 in reserved memory 222 of TPM 220. From this measured boot status 224, measured boot interface 242 may determine if measured boot is enabled or disabled and return the enabled or disabled status of measured boot on network device 200 through measured boot interface 242 in response to the received measured boot status command.

Embodiments of measured boot interface 242 may also provide a command to obtain TPM data from TPM 220 of network device 200 (again, referred to as a tpm pcr command). Such a tpm pcr command may allow the specification of a nonce to be utilized in obtaining TPM data (which may be an optional parameter) along with a specification of individual or ranges of (or both) PCR registers 228. This specification of PCR registers 228 in the tpm pcr command may include numerical identifiers for one or more individual PCR registers 228 or ranges of numerical identifiers for PCR registers 228. Thus, a tpm pcr command can be received at measured boot interface 242 of network device 200. In response to receiving such a tpm per command, measured boot interface 242 can obtain a quote from TPM 220 (e.g., issue a challenge to TPM 220) for PCR registers 228 specified in the received tpm pcr command using any nonce specified in the command, if one is provided (otherwise zero may be utilized as a nonce value when obtaining a TPM quote).

Using the TPM quote obtained from TPM 220, measured boot interface 242 may formulate a response to the received tpm pcr command. Specifically, measured boot interface 242 can determine the values of the PCR registers 228 specified in the received tpm pcr command from the quote data returned by TPM 220. Measured boot interface 242 then forms the response to the tpm pcr command to include a version of TPM being utilized by network device 200, along with the determined value for each of PCR registers 228 specified in the received tpm per command, where each of the values for a specified PCR register 228 is individually delineated and identified in the response in association with the corresponding specified PCR register 228 in a human readable format (e.g., visually correlated with an identifier for that PCR register 228). The response may also, in some cases, include the entirety of the quote data returned from TPM 220. In one embodiment, when forming the response measured boot interface 242 may retrieve public key 236 or other certificate data from certificate 256 stored at network device 200 and include certificate data (e.g., the AIK public key 236) associated with TPM 220 of network device 200 in the response being formed. Measured boot interface 242 may then return the formulated response to the received tpm pcr command through measured boot interface 242.

As discussed, network device 220 (e.g., bootloader 232 or operating system 240) may log every time a PCR register is extended with a new measurement in PCR log 234. This PCR log 234 includes a timestamp, PCR register index, event type, checksum the PCR register was extended with, and some metadata to help with debugging. Accordingly, measured boot interface 242 may provide a PCR log command to allow a user to obtain PCR log data from this PCR log 234. Thus, a PCR log command can be received at measured boot interface 242 of network device 200. In response to receiving such a PCR log command, measured boot interface 242 can obtain log data from PCR log 234 and return this PCR log data in response to the received PCR log command. In this manner, a user may easily obtain data useful for determining expected PCR values for each index based on the returned PCR log data and compare the obtained values with the actual PCR values extracted from TPM 220 (e.g., as returned from a tpm pcr command).

It may be useful to an understanding of embodiments to illustrate these measured boot commands in more detail. Attention is thus directed to FIGS. 3A, 3B and 3C, where FIG. 3A is a hybrid diagram illustrating a flow for one embodiment of a measured boot status command, FIG. 3B is a hybrid diagram illustrating a flow for one embodiment of a tpm pcr command, and FIG. 3C is a hybrid diagram illustrating a flow diagram for one embodiment of a PCR log command.

Figure 3A:
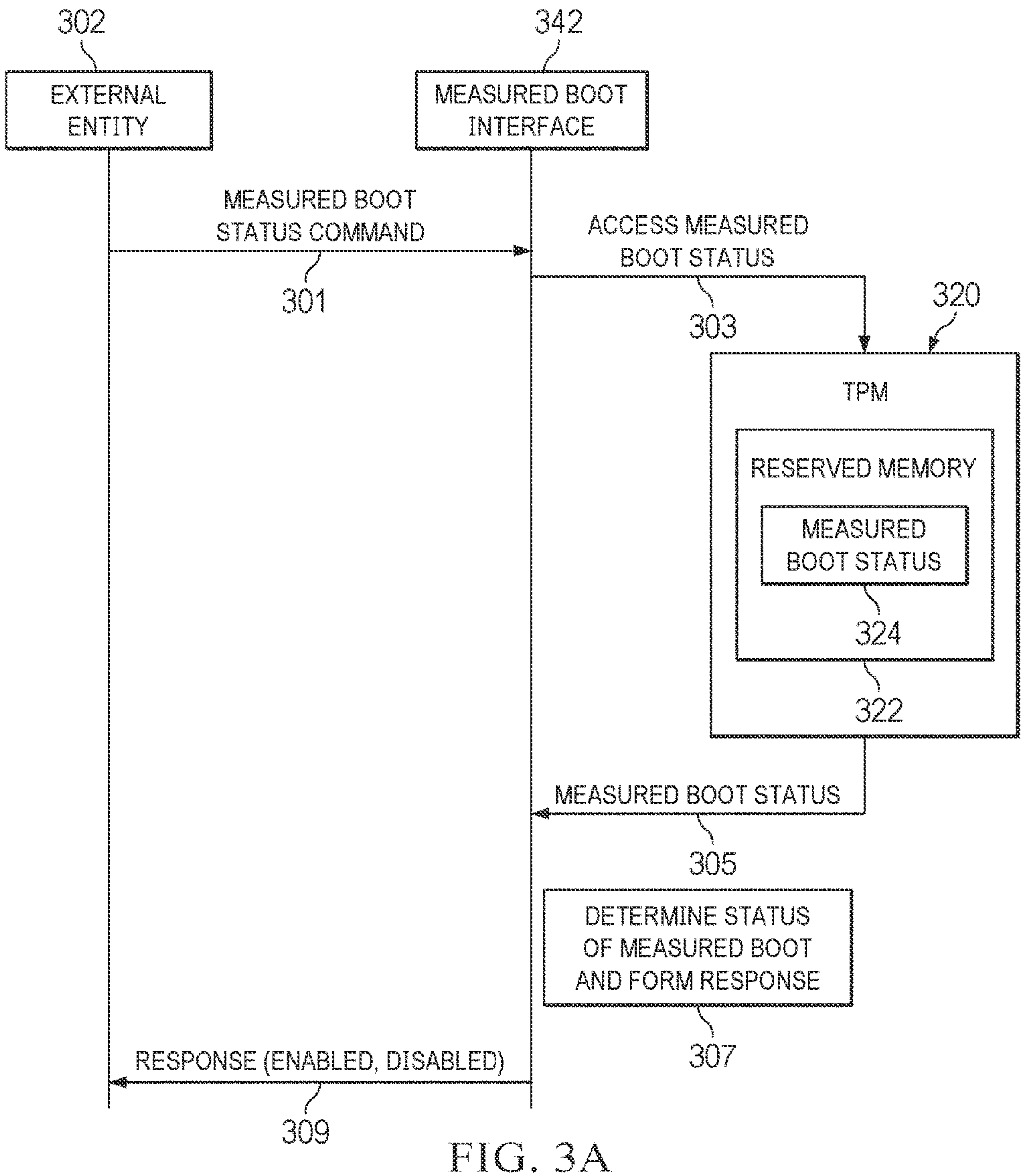
FIGS. 3A, 3B and 3C are hybrid diagrams depicting embodiments of the implementation of measured boot commands.

With reference first to FIG. 3A, a measured boot status command requesting an enablement status may be received from external entity 302 at measured boot interface 342 of a network device (STEP 301). In response to receiving such a measured boot command, measured boot interface 342 may access measured boot status 324 in reserved memory 322 of TPM 320 (STEP 303) to obtain this measured boot status (STEP 305). From this measured boot status 324, measured boot interface 342 may determine the status of measured boot on the network device (e.g., if measured boot is enabled or disabled) and form a response to the received measured boot command (STEP 307). This response, including the enabled or disabled status of measured boot on the network device, can then be returned through measured boot interface 342 in response to the received measured boot status command (STEP 309).

Figure 3B:
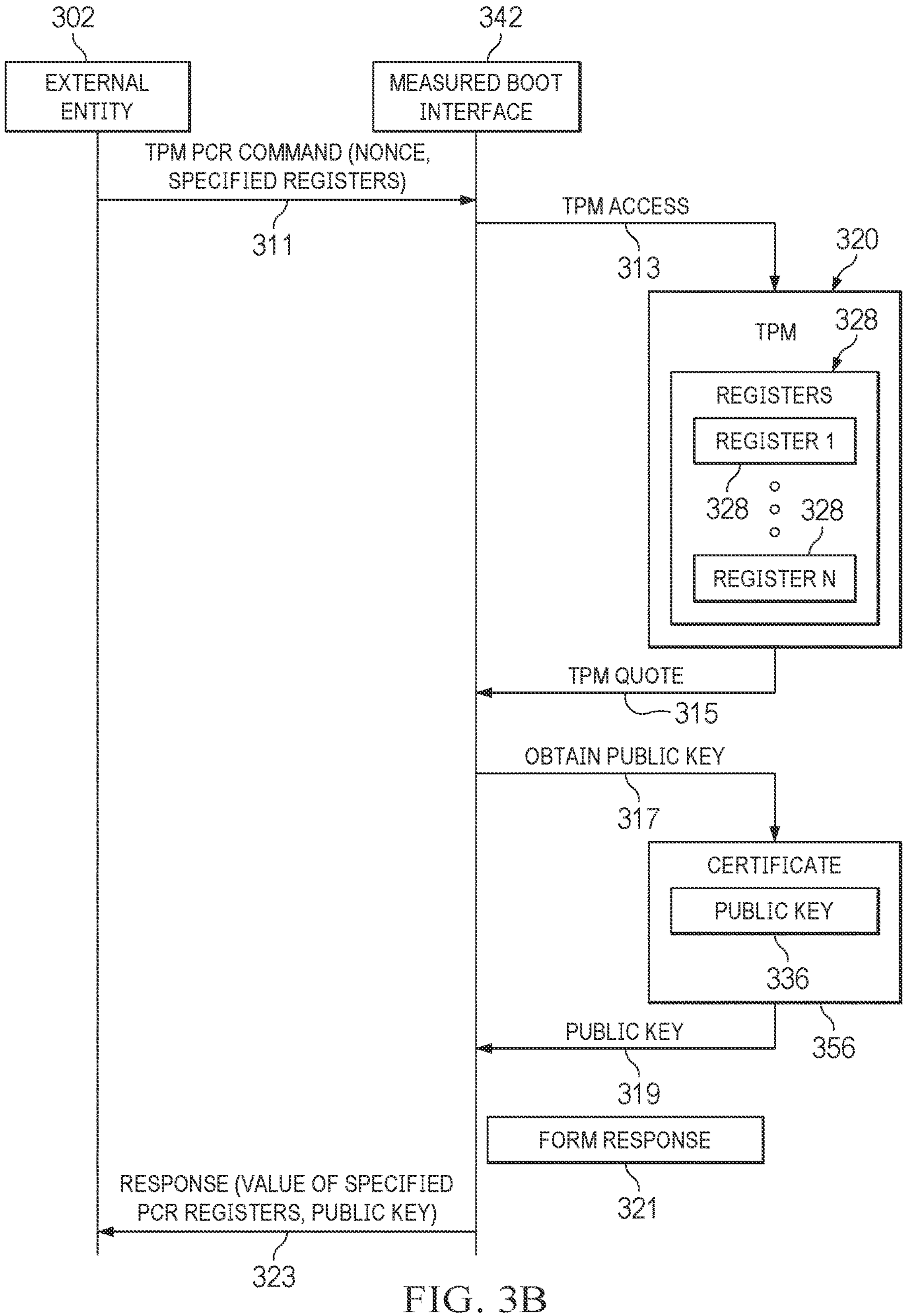
Figure 3C:
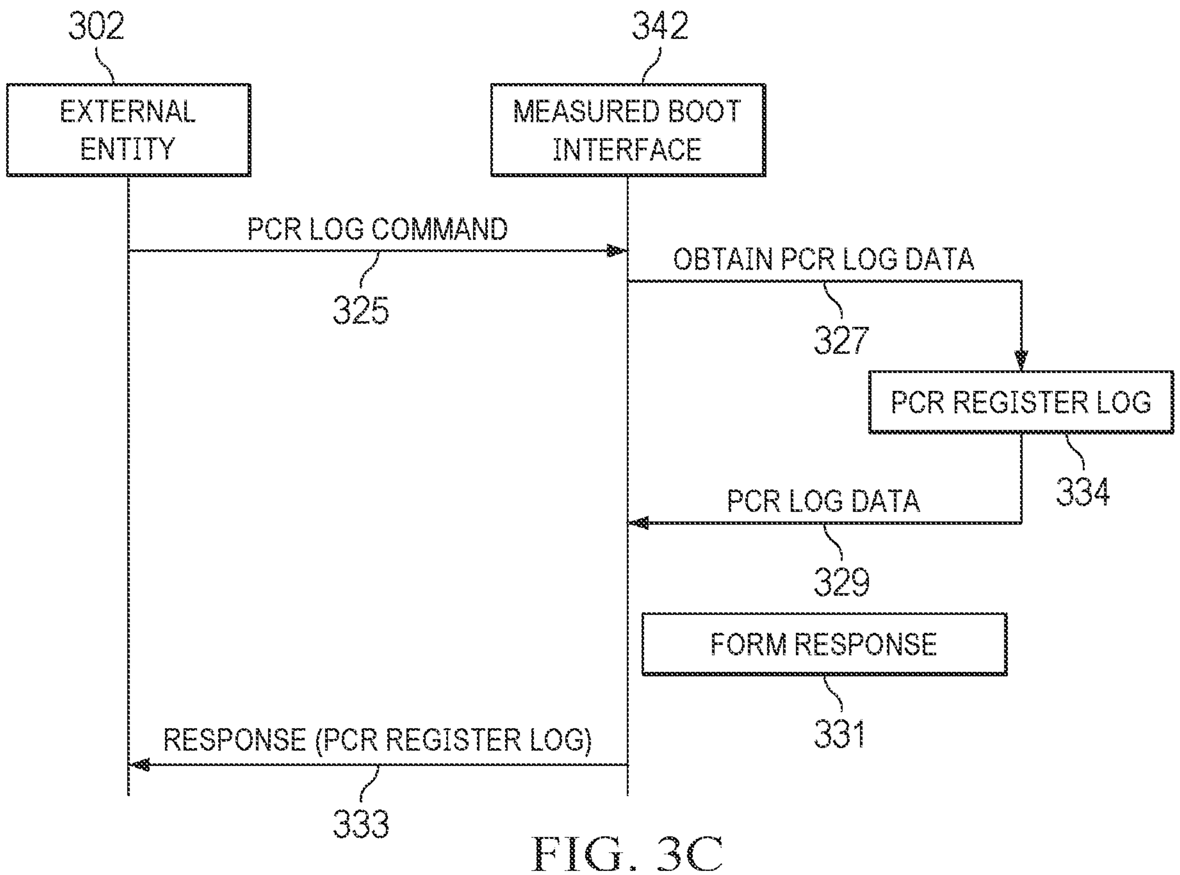

Moving on to FIG. 3B, a tpm por command to obtain TPM data from TPM 320 may be received at measured boot interface 342 of a network device (STEP 311). This received tpm pcr command may specify a nonce to be utilized in obtaining TPM data (which may be an optional parameter) along with a specification of individual or ranges of (or both) PCR registers 328 of TPM 320. In response to receiving such a tpm per command, measured boot interface 342 can obtain a quote from TPM 320 (e.g., issue a challenge to TPM 320) for PCR registers 328 specified in the received tpm per command using any nonce specified in the command (STEP 313). A TPM quote can then be returned to the measured boot interface 342 (STEP 315). Such a TPM quote may include two parts: "info" and "data". The info part is a binary structure that represents the current state of the PCR registers 328 and other relevant information, while the data part is a cryptographic signature generated by TPM 320 using its attestation key (e.g., the private key of the TPM 320). Measured boot interface 342 may also obtain public key 336 or other certificate data from certificate 356 the network device (STEPS 317, 319).

Moving on to FIG. 3B, a tpm pcr command to obtain TPM data from TPM 320 may be received at measured boot interface 342 of a network device (STEP 311). This received tpm pcr command may specify a nonce to be utilized in obtaining TPM data (which may be an optional parameter) along with a specification of individual or ranges of (or both) PCR registers 328 of TPM 320. In response to receiving such a tpm pcr command, measured boot interface 342 can obtain a quote from TPM 320 (e.g., issue a challenge to TPM 320) for PCR registers 328 specified in the received tpm per command using any nonce specified in the command (STEP 313). A TPM quote can then be returned to the measured boot interface 342 (STEP 315). Such a TPM quote may include two parts: "info" and "data". The info part is a binary structure that represents the current state of the PCR registers 328 and other relevant information, while the data part is a cryptographic signature generated by TPM 320 using it's attestation key (e.g., the private key of the TPM 320). Measured boot interface 342 may also obtain public key 336 or other certificate data from certificate 356 the network device (STEPS 317, 319).

Using the TPM quote obtained from TPM 320 and the obtained public key 336, measured boot interface 342 may formulate a response to the received tpm pcr command (STEP 321). Specifically, measured boot interface 342 can determine the values of the PCR registers 328 specified in the received tpm per command from the quote data returned by TPM 320. Measured boot interface 342 then forms the response to the tpm pcr command to include a version of TPM being utilized by the network device, along with the determined value for each of PCR registers 328 specified in the received tpm pcr command in a human readable format. The formed response may also include certificate data (e.g., the AIK public key 336) associated with TPM 320 of the network device. In some embodiments the response may also include the entirety (or a portion of) the quote data returned from TPM 320. Measured boot interface 342 may then return the formulated response to the received tpm per command through measured boot interface 342 (STEP 323).

Examples of the format of a tpm pcr command is shown below:

EOS-CLI # show management security tpm pcr [nonce NONCE] PCR_RANGE

The input parameter PCR_RANGE in this example may be used by the user to select the specific registers they are interested in. PCR_RANGE can be a range (0-5), individual registers (1,4,7), or a combination of both (0-5,7,9-12). NONCE may be an optional parameter. When specified, this value is added to the "info" part of the PCR quote by the TPM (and as a result also covered by the quote data signature). Specifying a unique and random nonce every time quotes are requested from the system may be strongly desired as including unique and random data in the PCR quotes prevent replay attacks, where an attacker cannot simply return old and stale quote information. NONCE may be specified as a hexadecimal string of a similar size to the hashing algorithm used for the PCR values (e.g., SHA1 is 20 bytes/40 ASCII characters, SHA256 is 32 bytes/64 ASCII characters . . . )

An example format of the response (output) of a tpm pcr command is presented below:

```
TPM version: <TPM_VERSION>
PCR Value
--- ----------------------------------------
<X> <PCR_VALUE>
<X> <PCR_VALUE>
<X> <PCR_VALUE>
Quote info: <INFO>
Quote data: <DATA>
AIK certificate: <CERTIFICATE>
```

In this example of an output format, the output parameter TPM_VERSION represents the version of the TPM installed on the network device (e.g., 1.2 or 2.0). Following the TPM version, is a table containing the values for each of the PCR indexes specified in the PCR_RANGE of the received tpm pcr command which generated the output. As discussed, quote info and data are two components of a quote returned by the TPM. In one embodiment, to provide a unified CLI command output independent of the TPM version employed on the network device those two fields may be binary data encoded in base64 in the output. The AIK certificate in the output is the certificate for the attestation key (e.g., AKI key pair) that may be stored at the network device or otherwise obtained.

Examples of tpm pcr commands and associated responses are presented below:

```
EOS-CLI# show management security tpm pcr 1,4,6
TPM version: 1.2
PCR Value
--- ----------------------------------------
1 0000000000000000000000000000000000000000
4 a11db9d584aebcb601f54c9c7a0ba0042460d25e
6 0d160bd9a8f83538a200995391927777aaa950a3
Quote info:
ADZRVVQyAAAAAAAAAAAAAAAAAAAAAAAAAAAAAA1IAAAG7cJIO8I027xOooBPjsVdC8
mXLtA==
Quote data:
dUymwO4CNRjvbGCJ43UDcZracPsO0j82KckLKaz+jgrVFhmher6CxfNDynghmds2qo4Oe8
oYgP9XDDf6SIRmInE4p6+wIirv2rBFf2xk0itcHvC7p+V9YzU65tjPWNdbE8OJRJTjhpPQc47I
CjBZMa1qwW921o0TCvIgjr8XJ9QtjgLOAcLVuLPzN+dPvjmI57H9Cs1qz7c7o1Cj8e+wsMBH
5oE2SY0NRO6rYRyzqQ8m0mofgsBiLP9IOQ9CIqbKenSehM52ARnUCeR424ygvM4p4IuF6
W3Z6BA77xOY/PmmK/GmrPGVr/Zwo5dr7qi0sVje37OW0s4M9ibMkX+7+g==
AIK certificate: -----BEGIN CERTIFICATE-----
MIICzTCCAbWgAwIBAgIBADANBgkqhkiG9w0BAQsFADBUMQswCQYDVQQGEwJVUzEL
MAkGA1UECAwCVVMxCzAJBgNVBAcMAIVTMQ0wCwYDVQQKDAR0ZXN0MQ0wCwYD
VQQLDAR0ZXN0MQ0wCwYDVQQDDAR0ZXN0MB4XDTIyMTAwNjIxNTgyNFoXDTIyMTA
wNzIxNTgyNFowADCCASIwDQYJKoZIhvcNAQEBBQADggEPADCCAQoCggEBALemvFu/
2id6kPGR1fI5qookyvn43C9ZO2ya2XzBV+EFeEwuf3ZzI2ejV3kIsSCE/IHLEpD6Afw9
Ga4WPLCKwUQfNRrPAIhIUr16aS/cG+GS3AbziTUjWrUyDbX271FBBdhycz25/eka
NcYTfLQ8rWWdu0h4fDudZohCpDWPz8Q9XRrhFb5sy1phv8brWiqcfdsSTZwbonn0
rwG54TO7b7FELBeJ3T2eqSnhCmriBF0tTbOcOkIzF9qhQVRhRiphDKw18Iu+iC6S
BSw9qg9q6cT6Z5sjD3s6NwETa6xcVQCyAMoq8+4vs/7UDAZunrccgFrDS2gX0NBn
ecmzZWzstY0CAwEAATANBgkqhkiG9w0BAQsFAAOCAQEALsks3HiWOoIKafU7edpp
wwIi2A3iIROqR0srYagCGuJIRIKpRrpo6QSRefz9wVMc5qeFeab0+GExMFkLjncb
7H+IQ/6BN+QnWH1KAv1ener+fd4Vf8HIIBabXQMS8hOsUXWj/n9KT+FPIF2SnQMA
dcSaZEGxkLD8c5QiIVpC5XStZiSWQD3s65IYbiJyzsfdGgDUXrM/o1jJ20AD9BBO
ZmkyG7ZybPVnjGkG45dLfuND+vs1s7ALMfgXzM66psgM5EDIk26M4/SnSGacDOGM
+Zt4SechD/UqIbLYrvMLRsp54Y1Ye/uIGEZ730hK9ydnpiN9r0wmFcK9RuTqy3mz
tg==
-----END CERTIFICATE-----
EOS-CLI# show management security tpm pcr nonce
  a9b91c7eb2b81b7c4c095f13892880ae1b78850d 5-7
TPM version: 1.2
PCR Value
--- ----------------------------------------
5 f2b1b35d18744f7d1382f2b79adae56fae45f693
6 0d160bd9a8f83538a200995391927777aaa950a3
7 5194ecd211f63a7f73297af078ea6fdeee86668c
Quote info:
ADZRVVQyqbkcfrK4G3xMCV8TiSiArht4hQ0AA+AAAAEpWVHiQ3RNhbkOvEleqAkvmMyM/
Q==
Quote data:
QvH3XJLhQuuenv5NzaVq2hEX0r8rTvpYibJRIbRA+e0VqCfCSR1U/pGJj+rru4sqIZaZEu+4w
+HgFVRqew5+KU1CXkvLQpMR4L994wUyG1eaQfrYJDgrkUP4wOcNIEO3WIFXMtO1UNU
RiyVC9aJSOq+RW0ZYrrzfU/tOncnY+7jPQeO8H2T7caPKNbKJACVySOKTNzWERtKoPDm
Nv+UJAf/LFUaOx7caVcqkEA59OM5DGHo0kfURoisDMKBN9DdbJLO/Ia5m2opWNy8ZspH
YGF85ninjGLXfjoJ8beoaQUm11CkWzHAHOsm1WowMIIqXYOcucyeC2hWj6rBSLu77cw==
AIK certificate: -----BEGIN CERTIFICATE-----
MIICzTCCAbWgAwIBAgIBADANBgkqhkiG9w0BAQsFADBUMQswCQYDVQQGEwJVUzEL
MAkGA1UECAwCVVMxCzAJBgNVBAcMAIVTMQ0wCwYDVQQKDAR0ZXN0MQ0wCwYD
VQQL
DAR0ZXN0MQ0wCwYDVQQDDAR0ZXN0MB4XDTIyMTAwNjIxNTgyNFoXDTIyMTAwNzIx
NTgyNFowADCCASIwDQYJKoZIhvcNAQEBBQADggEPADCCAQoCggEBALemvFu/2id6
kPGR1fI5qookyvn43C9ZO2ya2XzBV+EFeEwuf3ZzI2ejV3kIsSCE/IHLEpD6Afw9
Ga4WPLCKwUQfNRrPAIhIUr16aS/cG+GS3AbziTUjWrUyDbX271FBBdhycz25/eka
NcYTfLQ8rWWdu0h4fDudZohCpDWPz8Q9XRrhFb5sy1phv8brWiqcfdsSTZwbonn0
rwG54TO7b7FELBeJ3T2eqSnhCmriBF0tTbOcOkIzF9qhQVRhRiphDKw18Iu+iC6S
BSw9qg9q6cT6Z5sjD3s6NwETa6xcVQCyAMoq8+4vs/7UDAZunrccgFrDS2gX0NBn
```

-continued

```
ecmzZWzstY0CAwEAATANBgkqhkiG9w0BAQsFAAOCAQEALsks3HiWOoIKafU7edpp
wwIi2A3iIROqR0srYagCGuJIRIKpRrpo6QSRefz9wVMc5qeFeab0+GExMFkLjncb
7H+IQ/6BN+QnWH1KAv1ener+fd4Vf8HIIBabXQMS8hOsUXWj/n9KT+FPIF2SnQMA
dcSaZEGxkLD8c5QiIVpC5XStZiSWQD3s65IYbiJyzsfdGgDUXrM/o1jJ20AD9BBO
ZmkyG7ZybPVnjGkG45dLfuND+vs1s7ALMfgXzM66psgM5EDIk26M4/SnSGacDOGM
+Zt4SechD/UqIbLYrvMLRsp54Y1Ye/uIGEZ730hK9ydnpiN9r0wmFcK9RuTqy3mz
tg==
-----END CERTIFICATE-----
EOS-CLI# show management security tpm pcr nonce
   8e8e562bfe0602db800198ea6d7a214d8d
   4a4c3d3094c6df3d3c04fa54794475 0-23
TPM version: 2.0
PCR Value
--- ----------------------------------------------------------------
0 0000000000000000000000000000000000000000000000000000000000000000
1 0000000000000000000000000000000000000000000000000000000000000000
2 0000000000000000000000000000000000000000000000000000000000000000
3 0000000000000000000000000000000000000000000000000000000000000000
4 51643125a22a950c6e22fbffd6d906f238a5c37b128c887b2775edb8fad20604
5 a21ed4f36fcc5d165fa48c1e84638aa4424625bd3e1a41c2d9aa4ce6985af478
6 1243da6a625cce09b5a334c8a44d6a6f9241dfe86deb13a2658a775c59de4e97
7 790327067b8a6add8f24924dd2af942a3448a00f334652e51020ac5d874e6685
8 781fd5b269cad2dc7a5c6a95dff2d5b6e0ef34773a832c4f10e3ba25da18e928
9 4c51c086af1abc5e3f7f3417a7d6b458a0f04c9876e6d6a75d40162c2a831227
10 0000000000000000000000000000000000000000000000000000000000000000
11 0000000000000000000000000000000000000000000000000000000000000000
12 f5b5e8b4261e63e892d65e28ef59f33980dc9b9dfde6ba0bc3285a60efc9c2d2
13 0000000000000000000000000000000000000000000000000000000000000000
14 0000000000000000000000000000000000000000000000000000000000000000
15 0000000000000000000000000000000000000000000000000000000000000000
16 0000000000000000000000000000000000000000000000000000000000000000
17 ffffffffffffffffffffffffffffffffffffffffffffffffffffffffffffffff
18 ffffffffffffffffffffffffffffffffffffffffffffffffffffffffffffffff
19 ffffffffffffffffffffffffffffffffffffffffffffffffffffffffffffffff
20 ffffffffffffffffffffffffffffffffffffffffffffffffffffffffffffffff
21 ffffffffffffffffffffffffffffffffffffffffffffffffffffffffffffffff
22 ffffffffffffffffffffffffffffffffffffffffffffffffffffffffffffffff
23 0000000000000000000000000000000000000000000000000000000000000000
Quote info:
/1RDR4AYACIAC9bOovR0SQFbneBv6HLLBAVbu4ejXrW9HXXqIzcRXVNOACCOjIYr/gYC
24ABmOpteiFNjUpMPTCUxt89PAT6VHIEdQAAAACbcIIuAAA3vwAAAAABAAEBAgAAAAA
AAAABAAsD////ACB8v2CJB4QdjTcYzk8WDaQGopTgJZAgIsqjnVz7qzY9Dg==
Quote data:
ABQACwEAz6reJx4uBJKcwaKksVLf72xG4N5i4vrEW6weWibIh7RIr1TIqnyhngeu4RkGYzCJ
JDrhuOmTS1KURjbXRporNRzIQPIN4K1QITrZZZWAvQXr76wLdL9CKS7EFPy0aOhL4Lvwd
n+wYzgYJiJM4amw6ZnINrDKsrVGR9ena880NpJuF/MOwsR26IOeUIDvI5jp+F41CO9JhIKp
zJUDpPYt2JuvLi0QCZeBa07MIQ9iSe8hmIujOvn80SA7BX5CA8GQnM6s3HQKPa2aDRVW
SoF9znz8ZG9mSvn0zGHbrGM8gEwZ30nMWA3IxYyRK2JQGxyb5ARr2RPHjHoxEnn9ntfIw
w==
AIK certificate: -----BEGIN CERTIFICATE-----
MIICzTCCAbWgAwIBAgIBADANBgkqhkiG9w0BAQsFADBUMQswCQYDVQQGEwJVUzEL
MAkGA1UECAwCVVMxCzAJBgNVBAcMAIVTMQ0wCwYDVQQKDAR0ZXN0MQ0wCwYD
VQQLDAR0ZXN0MQ0wCwYDVQQDDAR0ZXN0MB4XDTIyMTAwODE1MzMyMIoXDTIyMT
AwOTE1MzMyMIowADCCASIwDQYJKoZIhvcNAQEBBQADggEPADCCAQoCggEBANkZrB
nFjBBSsP+qZXaVnXeLUNsqQknD+vf2ekG5Yr6WYojRJrDxa3MBecVw4H6u2zM8Zo7p3j9K
bAT62dMyajKdP52JO9fEhI/+XG0yJh2nrGW2f8ae5R7tXbMpV4uKt942jjNyj+MV
Vt+IzUq1qk3kk3IQzz1s4f2Z/HIaT2ti8+iLngh79Kd6neh2SSzAEe4BD55movtw
Gt8DzinW7/g49W2bYHfbIJ2wSVVxVcnM3O6wWyKrJrn7Iq0xgXn1vCHzrImXquUS
XBCUot243rcvs+Xz9rn9b2rkxbQOcxCL9nQp+QVMkr5TLzJNWJWh5sz4ADVGMpwf
mQ+f+z8OS18CAwEAATANBgkqhkiG9w0BAQsFAAOCAQEAUSpCAbgJoPRfN3iPE/Pf
xNtrNXEm1voxTfHULV1ICpgYGDpnDqrq0kKCITk8b1uD0/N9anjDdxI9yafJ5k0m
TRbIeUdNswBBUjsojCwtU15Y6NeRUJICAIE0QukeotkW6252eRqkcWsE39qhm2rM
km96IP8I//JWFF/e4OJmorgZO67XBLOkt3b3Uo0xdwsGcJbPEWrA19Y2una9cYZs
PaFZQrrtVBYR/dVyds/DA1qVj+KXUVQ6fCmB6aOauRYI9KMXa20hi1s00jR7us1O
9VffiPyGwn00MS6vK//g/iytHbtINJ0mhQjoLrIFvNZgcFtmD0s1oSzeA5wEzyGZ
uQ==
-----END CERTIFICATE-----
```

Referring now to FIG. 3C, a PCR log command can be received at measured boot interface 342 of a network device (STEP 325). In response to receiving such a PCR log command, measured boot interface 342 can obtain log data from PCR log 334 (STEPS 327, 329) and form a response to the PCR log command using this PCR log data (STEP 331). This response may include records of PCR log 334, including a record for every time a PCR register of the TPM on the network device was extended with a new measurement. Each of these records of the formed response may thus include a timestamp, a PCR register index for the PCR register extended, an event type, a checksum the PCR register was extended with, and some metadata. This response, including the records of the PCR log 334, can then be returned through measured boot interface 342 in response to the received PCR log command (STEP 331).

An examples of a PCR log command and associated response is presented below:

EOS-CLI# show management security tpm pcr log

| Timestamp | PCR | Event Type | Hexdecimal Extended | Additional Data |
|---|---|---|---|---|
| 2022-10-06 14:25:46 | 4 | abootImage | efc322931647f46a13e4ca00\ normal = Aboot-norcal9-9.0\ | 2d7da0a9a7b29f27 .5-4core-28240520 |
| 2022-10-06 14:25:50 | 5 | abootBootConfig | 625e523e4a6a9d504fc0ceed\ SWI = flash:/EOS.swi | d6641a86e120c686 |
| 2022-10-06 14:25:50 | 5 | abootPassword | 74410970002ca9d571a9c896\no-aboot-passwd | fcdbac8f79e7e13f |
| 2022-10-06 14:25:54 | 7 | abootSbConfig | fcec4ebaa8e6060bfe6a7c50\0x0029 | e5722f7cbc7c46f9 |
| 2022-10-06 14:26:23 | 6 | abootSwi | 73d84732932a4ee46eccbbfc\ SWI__VERSION = 4.29.1F \| | 647a210d2f6623dc trunk.1 SWI__RELEASE = 28948267.eos\ |
| 2022-10-06 14:26:24 | 8 | eosKernelParams | 3e8f360da87091f1868b2a9c\no-kernel-params | 02c7123e676f7ca3 |
| 2022-10-06 14:26:40 | 12 | eosExtensionInstall | e6b6415f06985578439501cd\no boot extensions | fab5fd6946763a53 |
| 2022-10-06 14:26:42 | 8 | eosRcEos | aa5b54d460f88b65651aa385\no/mnt/flash/rc.eos file | d5e955d134b19575 found |
| 2022-10-06 14:27:42 | 9 | eosStartupConfig | 69723ef9a2cfd7c69780c5ba\loaded startup-config: | 0a47f0ec311040b6/mnt/flash/startup-config |

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the disclosure will be employed without a corresponding use of other features, and features described with respect to one embodiment may be combined with features of other embodiments without departing from the scope and spirit of the disclosure as set forth.

What is claimed is:

1. A network device, comprising:

a processor;

a Trusted Platform Module (TPM) including a plurality of Platform Configuration Registers (PCRs); and a non-transitory computer readable medium, comprising instructions for an operating system adapted to execute on the processor of the network device, wherein the operating system is adapted to provide a TPM interface for receiving a request for TPM data and specifying one or more PCRs, and wherein, in response to receiving the request, the operating system executing on the network device is adapted to:

obtain a TPM quote from the TPM by accessing the TPM at the network device, by the operating system executing on the network device, wherein the TPM quote is a reading of storage locations of the TPM signed by a private key belonging to that particular TPM;

process, by the operation system executing on the network device, the TPM quote obtained by the operating system from the TPM to extract a value for each of the one or more PCRs specified in the request from the TPM quote; and return, by the operating system executing on the network device, a response to the request though the TPM interface of the operating system executing on the network device, wherein the response comprises TPM data including an identification of each the one or more specified PCRs in the received request and the extracted value corresponding to each of the one or more specified PCRs extracted from the TPM quote.

2. The network device of claim 1, wherein the TPM interface is a command line interface and the request is a tpm por command.

3. The network device of claim 2, wherein the TPM data is returned in a human readable format.

4. The network device of claim 1, wherein the TPM interface is an Application Programming Interface (API).

5. The network device of claim 4, wherein the TPM data is in a machine readable format.

6. The network device of claim 1, wherein the TPM data includes a version of TPM implemented on the network device.

7. The network device of claim 1, wherein the TPM data includes data from the obtained TPM quote.

8. The network device of claim 1, wherein the TPM data includes AIK certificate data associated with the TPM of the network device.

9. A method, comprising:

receiving a request for Trusted Platform Module (TPM) data at an interface of an operating system executing on a device, wherein the device includes a TPM comprising a plurality of Platform Configuration Registers (PCRs), and wherein the request specifies one or more of the PCRs;

obtaining a TPM quote from the TPM by accessing the TPM at the network device, the operating system executing on the network device, wherein the TPM quote is a reading of storage locations of the TPM signed by a private key belonging to that particular TPM;

processing, at the operation system executing on the device where the request was received, the TPM quote obtained by the operating system from the TPM to extract a value for each of the one or more PCRs specified in the request received at the interface of the device; and returning a response to the request through the interface of the operating system of the device wherein the response comprises TPM data associated with each of the extracted values for the specified PCRs in the received request extracted from the TPM quote at the device.

10. The method of claim 9, further comprising:

receiving a measured boot status command through the interface; and returning an enablement status through the interface in response to the measured boot status command.

11. The method of claim 10, further comprising retrieving the enablement status from a configuration store residing in the TPM.

12. The method of claim 11, wherein the configuration store is in reserved memory on the TPM.

13. The method of claim 12, wherein reserved memory is writable only from a bootloader and is readable from an operating system of the device.

14. The method of claim 9, wherein the interface is a command line interface and the response is human readable or the interface is an Application Programming Interface (API) and the TPM data is in a machine readable format.

15. The method of claim 9, wherein the TPM data includes a version of TPM implemented in association with the TPM.

16. The method of claim 9, wherein the TPM data includes TPM quote data from the TPM quote.

17. The method of claim 9, wherein the TPM data includes key data associated with the TPM of the device.

18. A non-transitory computer readable medium, comprising instructions for:

providing a TPM interface at an operating system executing on a device, the TPM interface adapted for receiving a request for TPM data through the operating system at the device, wherein the request specifies one or more PCRs; and in response to receiving the request:

obtaining a TPM quote from the TPM by accessing the TPM at the network device, the operating system executing on the network device, wherein the TPM quote is a reading of storage locations of the TPM signed by a private key belonging to that particular TPM;

processing, by the operation system executing on the device, the TPM quote obtained by the operating system from the TPM to extract a value for each of the one or more PCRs specified through the request received at the device; and returning, by the operating system executing on the network device, a response to the request though the TPM interface of the operating system of the device wherein the response comprises TPM data including an identification of each the one or more specified PCRs in the received request and the extracted value corresponding to each of the one or more specified PCRs extracted from the TPM quote at the device.

19. The non-transitory computer readable medium of claim 18, wherein the TPM interface is adapted to allow specification of a nonce and the TPM quote is obtained based on the specified nonce.

20. The non-transitory computer readable medium of claim 18, wherein the TPM interface is a command line interface and the TPM data is returned in a human readable format or the TPM interface is an Application Programming Interface (API) and the TPM data is in a machine readable format.

* * * * *